(12) United States Patent
Blom-Schieber

(10) Patent No.: US 11,485,468 B2
(45) Date of Patent: Nov. 1, 2022

(54) THERMOPLASTIC MULTI-GRID OVERMOLDED/CO-CONSOLIDATED AIRCRAFT FUSELAGE STRUCTURE

(71) Applicant: The Boeing Company, Chicago, IL (US)

(72) Inventor: Adriana Willempje Blom-Schieber, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 985 days.

(21) Appl. No.: 16/144,665

(22) Filed: Sep. 27, 2018

(65) Prior Publication Data
US 2020/0102062 A1    Apr. 2, 2020

(51) Int. Cl.
*B64C 1/08* (2006.01)
*B64C 1/12* (2006.01)
*B64C 1/00* (2006.01)

(52) U.S. Cl.
CPC ............... *B64C 1/08* (2013.01); *B64C 1/12* (2013.01); *B64C 2001/0072* (2013.01)

(58) Field of Classification Search
CPC .. B64C 1/068; B64C 1/08; B64C 1/12; B64C 3/24; B64C 3/26; B64C 2001/0072
See application file for complete search history.

(56) References Cited

U.S. PATENT DOCUMENTS

| | | | |
|---|---|---|---|
| 8,079,549 B2 * | 12/2011 | Gouvea | B29C 66/5346 244/119 |
| 2011/0315824 A1 | 12/2011 | Pook et al. | |
| 2016/0368585 A1 | 12/2016 | Farouz-Fouquet | |

FOREIGN PATENT DOCUMENTS

| | | |
|---|---|---|
| DE | 10253300 | 6/2004 |
| DE | 10253300 A1 | 6/2004 |
| JP | 2011-126075 | 6/2011 |
| JP | 2011126075 A | 6/2011 |
| WO | 2018029167 A1 | 2/2018 |
| WO | WO2018/029167 | 2/2018 |

OTHER PUBLICATIONS https://www.victrex.com/~media/media-coverage/en/compositesworld. pdf Overmolding Expands PEEK's Range in Composites by Ginger Gardiner CompositesWorld.com.
https://victrex.com/~/media/whitpapers/performance-and-simulations-of-a-thermoplastic-paek-hybrid-composite-system-whitepaper.pdf Performance and Simulation of a Thermoplastic Paek Hybrid Composite System by Ferfecki, Tanaka, Chung, Hyaduk Victrex plc.
(Continued)

*Primary Examiner* — Nicholas McFall
(74) *Attorney, Agent, or Firm* — Quinn IP Law

(57) ABSTRACT

An aircraft structure and its method of construction avoids the inefficiencies involved in current methods of constructing the aircraft structure, reduces the manufacturing time required for constructing the aircraft structure and reduces the cost involved in constructing the aircraft structure. The aircraft structure and its method of construction is comprised of a geodesic or multi-grid framework of intersecting thermoplastic composite strips that are joined to an interior surface of a thermoplastic composite fuselage skin panel through overmolding/co-consolidation of the grid framework and the skin panel.

19 Claims, 4 Drawing Sheets

(56) References Cited

OTHER PUBLICATIONS

ThermoPlastic Composites Research Center; Overmolding; obtained from Internet Archive Wayback Machine at http://web.archive.org/web/20181030010912/https://tprc.nl/research-overview/overmolding/; captured Oct. 30, 2018.

TPRC Successfully Finalises Overmoulding Project With Aerospace and Automotive Partners; Basalt.Today at https://basalt.today/2017/03/29162/; dated Mar. 14, 2017.

Office Action dated Nov. 11, 2020 in co-pending EPO Application No. 19187353.8.

Extended European Search Report dated Jan. 23, 2020 from co-pending EPO Patent Application No. 19187353.8.

Video screenshots of TPRC Research: Automated one-step overmolding process for C/PEEK; YouTube at https://www.youtube.com/watch?v=T-PJgCPNt9Q; dated Jan. 18, 2018.

Video screenshots of Victrex Hybrid Moulding Technology; YouTube at https://www.youtube.com/watch?v=ydMmN8A5pWY; dated Sep. 29, 2015.

Gardiner, Ginger; Overmolding expands PEEK's range in composites; https://www.victrex.com/~media/media-coverage/en/compositesworld.pdf; CompositesWorld.com; dated Jul. 2015.

Ferfecki, Frank; Tanaka, Masakaza; Chung, Simon; Hayduke, Devlin; Performance and Simulation of a Thermoplastic Paek Hybrid Composite System; Victrex at https://victrex.com/~/media/whitepapers/performance-and-simulations-of-a-thermoplastic-paek-hybrid-composite-system-whitepaper.pdf; Aug. 2016.

Gardiner, Ginger; Manufacturing the upper half of the Multifunctional Fuselage Demonstrator (MFFD); CompositesWorld at https://www.compositesworld.com/articles/manufacturing-the-upper-half-of-the-multifunctional-fuselage-demonstrator-mffd; published Jan. 21, 2021.

* cited by examiner

THERMOPLASTIC MULTI-GRID OVERMOLDED/CO-CONSOLIDATED AIRCRAFT FUSELAGE STRUCTURE

FIELD

This disclosure pertains to an aircraft structure and its method of construction that avoids the inefficiencies involved in current methods of constructing the aircraft structure, reduces the manufacturing time required for constructing the aircraft structure and reduces the cost involved in constructing the aircraft structure. More specifically, the aircraft structure and its method of construction of this disclosure is comprised of a geodesic or multi-grid framework of intersecting thermoplastic composite strips that are joined to an interior surface of a thermoplastic composite fuselage skin panel through overmolding and/or co-consolidation of the grid framework and the skin panel.

BACKGROUND

In conventional, basic aircraft construction, the skin panels of the aircraft that make up the fuselage of the aircraft are attached over and supported on a stiffening framework. The framework often has a general rectangular configuration comprised of frames that extend around the circumference of the fuselage, and stringers that may be attached to the frames and run in the longitudinal direction of the fuselage. The skin panels that form the aircraft fuselage are attached to the stringers by fasteners, by adhesives, by co-curing or by other equivalent means. The stringers help carry the bending loads in the fuselage and support the skin panels to prevent them from buckling. The stringers may also transfer loads from the skin panels of the aircraft fuselage to the frames of the aircraft framework if they are connected to the frames.

The costs of constructing an aircraft with a framework comprised of stringers and frames contributes significantly to the overall cost of the aircraft. Stringers and frames often have to be formed over complex contours, which in case of a composite structure may take several manufacturing steps and may require extra attention to avoid wrinkles. Positioning and attaching the stringers and frames relative to each other and to the skin panels of the fuselage contribute substantially to the time required for constructing the aircraft, and thereby contribute to the overall cost of the aircraft.

Constructing the framework of the aircraft from the frames and stringers also requires that the frames and stringers be constructed with intricate patterns, following the irregular inner surface of the fuselage skin. This contributes significantly to the engineering time and tooling cost required for constructing the aircraft. Additionally, fasteners used to connect stringers, frames and skins contribute significantly to the assembly time of the aircraft and the weight of the aircraft.

Still further, with the framework of frames and stringers having a general, rectangular configuration, integrating window openings or other generally circular openings into the framework can be a problem. It is often necessary that window frames or circular opening frames be bolted to the framework after the framework is constructed. Other penetrations, such as for drain masts or antennas require local reinforcements of the skin, which are accomplished by including small piles in the composite layup. This adds more time required for the aircraft construction and more weight to the aircraft construction.

SUMMARY

The thermoplastic multi-grid overmolded/co-consolidated aircraft fuselage structure and its method of construction of this disclosure overcome many of the shortcomings associated with current practices of constructing an aircraft fuselage discussed earlier. The aircraft structure of this disclosure employs an overmolding process that significantly simplifies the aircraft structure and significantly reduces the time required for constructing the aircraft structure.

The aircraft structure and its method of construction described herein is part of a small portion of a complete aircraft fuselage. However, the aircraft structure and the method described herein can be employed in constructing large sections of an aircraft fuselage that are later assembled to form the overall structure of the aircraft fuselage. Additionally, the aircraft structure and its method of construction can be employed in constructing other parts of an aircraft.

The aircraft structure is comprised of a skin panel having an exterior surface and an opposite interior surface. The exterior surface of the skin panel will form a portion of the exterior surface of the aircraft fuselage. According to the method of this disclosure, the skin panel is positioned in a mold with the exterior surface of the skin panel contacting a surface of the mold. In an alternative method, the plurality of strips are positioned in a mold, the skin panel is positioned over the plurality of strips and then the mold is closed.

A plurality of strips are then positioned on the interior surface of the skin panel in the mold. The plurality of strips have elongate length dimensions, width dimensions and thickness dimensions. The plurality of strips also have slots that extend partially through the width dimensions of the strips. The slots enable the plurality of strips to be assembled together in an intersecting, geodesic or multi-grid configuration by assembling the plurality of strips together at their slots. The plurality of strips assembled together in the geodesic or multi-grid configuration are positioned in the mold on the interior surface of the skin panel with edges of the plurality of strips engaging on the interior surface of the skin panel. This positions the width dimensions of the plurality of strips extending outwardly from the interior surface of the skin panel in the mold.

The mold is then closed over the plurality of strips on the interior surface of the skin panel inside the mold. A heated, liquefied overmolding material is then injected into the mold. The overmolding material flows through the mold and extends between the interior surface of the skin panel and the plurality of strips on the interior surface of the skin panel. The heat of the overmolding material causes contacting portions of the interior surface of the skin panel and the plurality of strips to melt, fusing together the contacting portions of the interior surface of the skin panel and the plurality of strips. The overmolding material injected in the mold is then allowed to cool, forming joints between the contacting portions of the interior surface of the skin panel and the plurality of strips. In this manner, the overmolding material secures the plurality of strips to the interior surface of the skin panel and to each other at the slotted interface locations.

The mold is then opened, and the aircraft structure comprised of the skin panel, the plurality of strips on the interior surface of the skin panel, and the overmolding material securing the plurality of strips to the interior surface of the skin panel is removed from the mold.

According to the above-described method, an aircraft fuselage structure is constructed comprised of a skin panel, a plurality of intersecting strips secured to the interior surface of the skin panel, and an overmolding material securing the plurality of strips to the interior surface of the skin panel.

Additional cavities in the mold may be filled with the overmolding material to create smaller stiffening elements perpendicular to the skin and/or plurality of strips to support the skin, the plurality of strips or both; and to prevent buckling or introduce loads and add thickness to the skin or plurality of strips to act as a doubler in locations where they will be penetrated.

The features, functions, and advantages that have been discussed can be achieved independently in various embodiments or may be combined in yet other embodiments, further details of which can be seen with reference to the following description and drawings.

DETAILED DESCRIPTION

Figure 1:
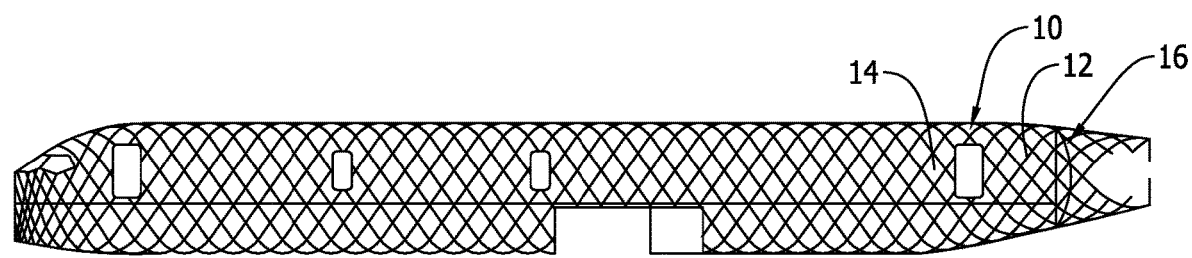
FIG. 1 is a schematic representation of a cross-section elevation view of the thermoplastic multi-grid overmolded/co-consolidated aircraft fuselage constructed according to the method of this disclosure.

FIG. 1 is a representation of a cross-section, elevation view of an aircraft fuselage 10 that is comprised of stiffener strips 12 that are joined to and secured to an interior surface of the skin 14 of the aircraft fuselage 10. The stiffener strips 12 and the skin 14 of the fuselage are constructed from fiber-reinforced thermoplastic composite materials. The stiffener strips 12 intersect and are secured together in a geodesic or multi-grid a framework 16 secured to the interior surface of the skin 14. The skin 14 is comprised of a plurality of aircraft skin panels that form the skin of the fuselage 14.

Figure 2:
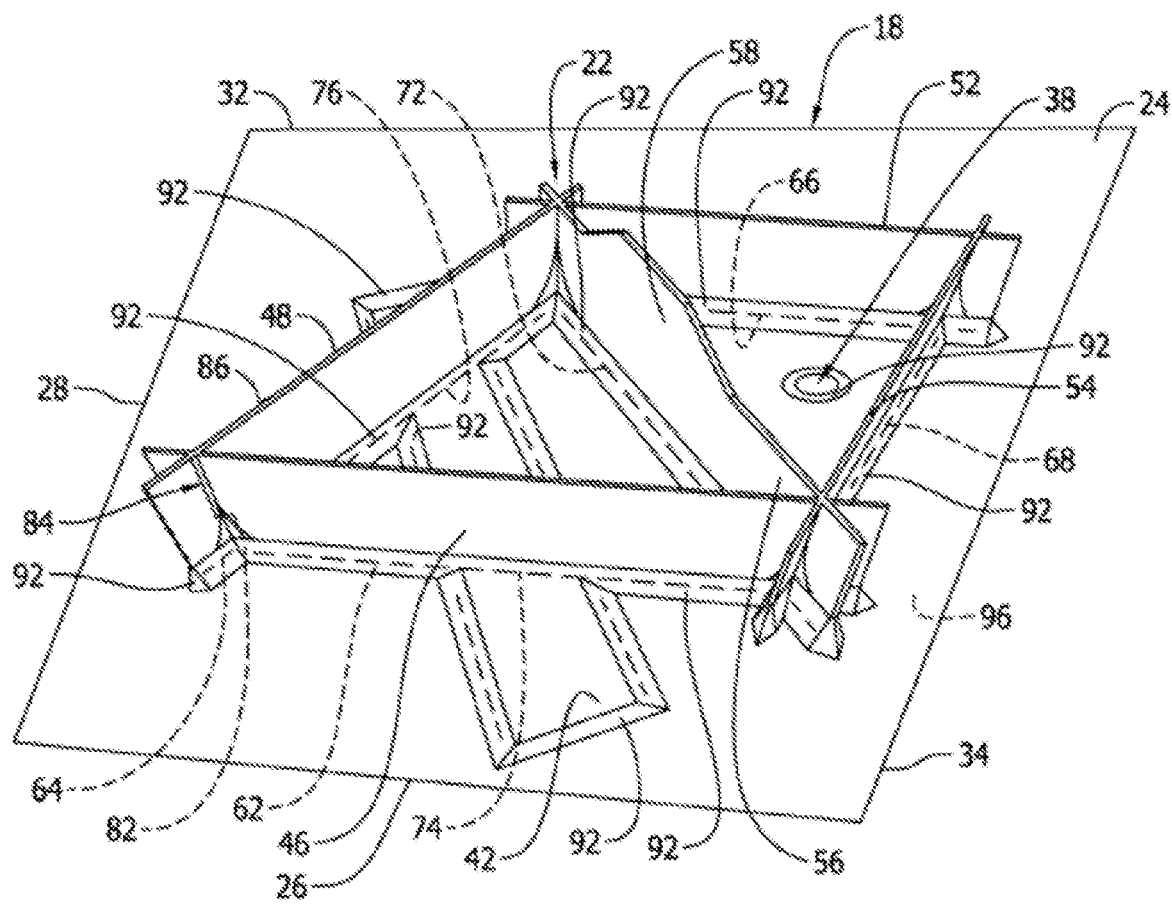
FIG. 2 is a representation of a top perspective view of a thermoplastic multi-grid overmolded/co-consolidated fuselage structure of the aircraft fuselage represented in FIG. 1.

FIG. 2 is a schematic representation of an individual skin panel 18 of fiber-reinforced thermoplastic composite material of the plurality of skin panels that comprise the aircraft fuselage 14, and a plurality of strips 22 of fiber-reinforced thermoplastic composite material secured to the interior surface 24 of the skin panel 18. It should be understood that the skin panel 18 and the strips 22 of FIG. 2 make up just one portion of the overall multi-grid framework 16 and the fuselage skin 14 of the aircraft fuselage 10 represented in FIG. 1. The construction of the skin panel 18 and the plurality of strips 22 of FIG. 2 is repeated in similar sub-assemblies that make up the overall construction of the multi-grid framework 16 and fuselage skin 14 represented in FIG. 1.

The skin panel 18 represented in FIG. 2 is a thermoplastic composite laminate. The thickness of the skin panel 18 is chosen to best suit the skin panel 18 to the loads the aircraft fuselage 10 will be subjected to in use. The peripheral edge of the skin panel 18 represented by the four edges 26, 28, 32, 34 of FIG. 2 is cut and shaped to a desired configuration. Although the peripheral edge has a general rectangular configuration in FIG. 2, the peripheral edge of the skin panel 18 could be cut and shaped to any other desired configuration. Also represented in FIG. 2 is an opening 38 through the skin panel 18. The opening 38 of FIG. 2 is relatively small, but represents any type of opening such as a window opening or systems penetration that will be needed through the skin panel 18.

A padup strip 42 is represented in FIG. 2 on the interior surface 24 of the skin panel 18. The padup 42 reinforces the area of the skin panel 18 where the padup 42 is positioned. The padup 42 is represented in FIG. 2 as having a general elongate, rectangular configuration. However, the padup 42 could have any other configuration to reinforce the area of the skin panel 18 where the padup 42 is positioned. The padup 42 also has a stepped, cross-section configuration providing a greater thickness and a greater reinforcement to the skin panel 18 at the thicker, center portion of the padup. The padup 42 is also a thermoplastic composite laminate and could be integral to the laminate making up the skin.

The plurality of stiffener strips 22 are positioned on the interior surface 24 of the skin panel 18. Each of the plurality of stiffener strips 22 could be cut to shape and trimmed from a blank of composite laminate, or they could be laid up with strips or tapes of composite material. Each of the plurality of stiffener strips 22 is represented in FIG. 2 as being a flat laminate strip of composite materials. However, each of the plurality of strips 22 could be pre-curved by laying the strip up on a curved surface or by curving a flat laminate in a heated press. Each stiffener of the plurality of stiffeners 22 could be formed with layers of the laminate comprising the stiffener having fibers oriented in different directions, for example +60°, −60° and/or 0° or any other orientation. Each stiffener of the plurality of stiffeners 22 could also be formed with fittings, brackets or other like geometries. Each stiffener strip of the plurality of stiffener strips 22 could also be formed with reinforcing flanges or other similar stiffening elements. Five stiffener strips 46, 48, 52, 54, 56 are represented in FIG. 2. However, the number of stiffener strips 22 could be greater or lesser than the five stiffener strips 46, 48, 52, 54, 56 shown in FIG. 2. Each of the stiffener strips 46, 48, 52, 54, 56 is a thermoplastic composite laminate. Each of the stiffener strips 46, 48, 52, 54, 56 is cut from a laminate sheet in a desired shape or configuration. Each of the stiffener strips 46, 48, 52, 54, 56 represented in FIG. 2 have general rectangular, elongate configurations. However, the stiffener strips 22 could be cut and shaped in other configurations. Four of the stiffener strips 46, 48, 52, 54 are represented in FIG. 2 as having substantially the same length dimensions, width dimensions and thickness dimensions. However, the stiffener strips 22 could have different length dimensions, width dimensions and thickness dimensions. The stiffener strip 56 at the center of FIG. 2 is represented as having a central portion 58 having a greater thickness dimension than the other stiffener strips 46, 48, 52, 54 and a greater width dimension than the other stiffener strips 46, 48, 52, 54. Each of the stiffener strips 46, 48, 52, 54, 56 has a bottom edge 62, 64, 66, 68, 72, respectively. The bottom edges 62, 64, 66, 68, 72 of the respective strips 46, 48, 52, 54, 56 are trimmed, cut or shaped so that they closely match the contour of the interior surface 24 and conform to and engage entirely with the interior surface 24 of the skin panel 18 when the stiffener strips 22 are assembled onto the interior surface 24 of the skin panel 18. A first strip 46 and a second strip 48 of the plurality of strips 22 are formed with bottom edge cutouts 74, 76, respectively. The bottom edge cutouts 74, 76 are shaped so that they conform to and engage with the top surface of the padup 42 when the first strip 46 and second strip 48 are positioned on the interior surface 24 of the skin panel 18 as represented in FIG. 2.

The stiffener strips 22 are positioned on the interior surface 24 of the skin panel 18 in an intersecting grid pattern, or intersecting geodesic or multi-grid configuration. The pattern formed by the stiffener strips 22 can be tailored locally to accommodate variations in load levels and directions. With the intersecting geodesic or multi-grid configuration of the stiffener strips 22 positioned on the interior surface 24 of the skin panel 18, the width dimensions of the plurality of stiffener strips 22 extend outwardly from the interior surface 24 of the skin panel 18. The intersecting stiffener strips 22 are connected together by providing mating slots in intersecting strips and later by overmolding material to be described. Other equivalent types of connections between the strips 22 could be used. The adjacent, intersecting first strip 46 and second strip 48 have respective slots 82, 84 partially formed through the strips. The slot 82 of the first strip 46 is formed partially through the first strip 46 from the bottom edge 62 of the strip. The slot 84 through the second strip 48 is formed partially through the second strip 48 from a top edge 86 of the second strip. The second strip 48 is inserted into the partial slot 82 of the first strip 46 at the partial slot 84 of the second strip 48, and the first strip 46 is inserted into the partial slot 84 of the second strip 48 at the partial slot 82 of the first strip 46. This forms the intersecting joint between the first strip 46 and the second strip 48. The intersections of the other strips of the plurality of strips 22 can be joined together in the same manner as the intersection between the first strip 46 and the second strip 48.

Figure 4:
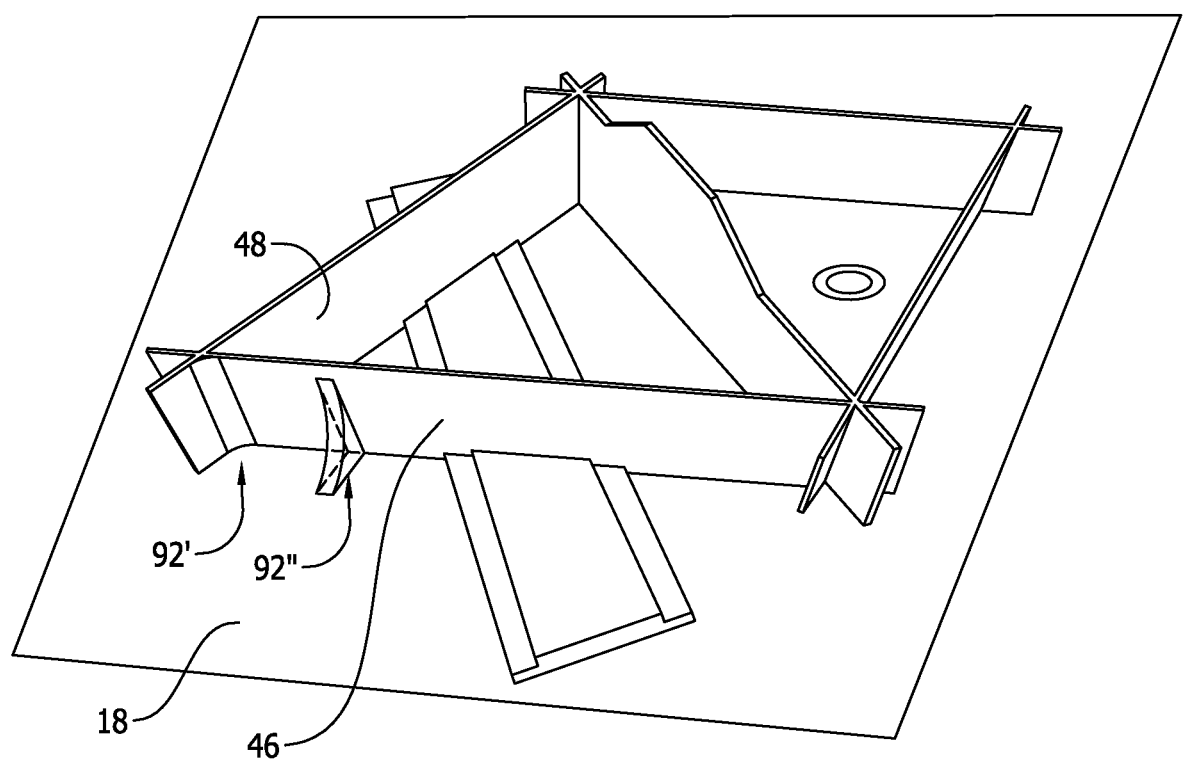
FIG. 4 is a representation similar to that of FIG. 2, and showing an example of overmolding material formed as a stiffener fillet between intersecting stiffener strips and formed as a stiffener triangle.

An overmolding compound or overmolding material 92 is provided on the interior surface 24 of the skin panel 18. The overmolding material 92 can be any type of thermoplastic resin, or any type of thermoplastic resin that is infused with reinforcements, for example short fiber reinforcements. The overmolding compound or overmolding material 92 could also be a neat resin, an injection/molding material or a type of reinforced resin material that is compatible with the resin material of the skin panel 18 and the plurality of stiffener strips 22. The overmolding material 92 extends over portions of the interior surface 24 of the skin panel 18, over the padup 42 and over portions of the plurality of stiffener strips 22. The overmolding material 92 secures the plurality of stiffener strips 22 to the interior surface 24 and padup 42 of the skin panel 18 and it secures the stiffener strips to their respective neighbors. The overmolding material 92 could be formed as reinforcing flanges for the plurality of stiffeners 22, or as other types of reinforcement on the interior surface 24 of the skin panel 18, for example a thicker, reinforcing perimeter around the opening 38 through the skin panel 18. FIG. 4 is a representation of the overmolding material 92 formed as a stiffener fillet 92' at the intersection of the first stiffener strip 46 and second stiffener strip 48, and formed as a stiffener triangle 92" between the skin panel 18 and the second stiffener strip 48.

Figure 3:
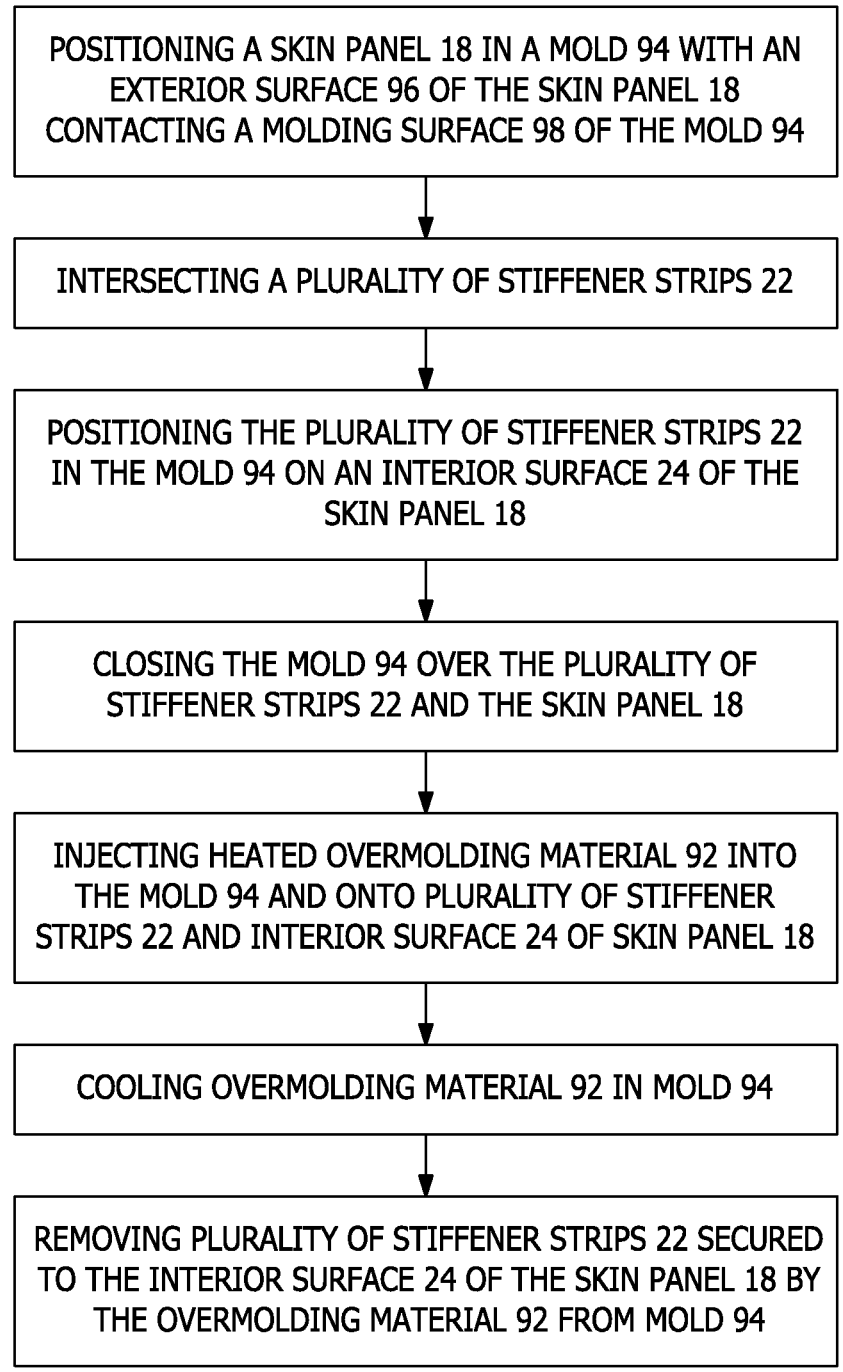
FIG. 3 is a flow chart representation of the method of this disclosure of constructing the thermoplastic multi-grid overmolded/co-consolidated fuselage structure.

FIG. 3 represents method steps involved in constructing the aircraft structure of FIG. 2. Initially, the skin panel 18 is positioned in a mold 94. The skin panel 18 is positioned in the mold 94 with an exterior surface 96 of the skin panel 18 contacting and being supported on a molding surface 98 of the mold 94. The exterior surface 96 of the skin panel 18 will form a portion of the exterior surface of the aircraft fuselage 10.

The padup 42 and the plurality of stiffener strips 22 are then positioned on the interior surface 24 of the skin panel 18. The plurality of strips 22 are assembled into the geodesic or multi-grid configuration when they are positioned in the mold 94 and on the interior surface 24 of the skin panel 18. The width dimensions of the plurality of strips 22 extend outwardly from the interior surface 24 of the skin panel 18.

The mold 94 is then closed over the skin panel 18 and the plurality of stiffener strips 22 on the interior surface 24 of the skin panel 18. The mold 94 could then be heated to heat the plurality of strips 22 and the interior surface 24 of the skin panel 18. The heat in the mold 94 could partially melt the padup 42, the plurality of stiffener strips 22 and the interior surface 24 of the skin panel 18 causing the padup 42, the plurality of stiffener strips 22 and the interior surface 24 of the skin panel 18 to fuse together. Depending on what type of thermoplastic composite material is used in constructing the aircraft structure of FIG. 2, it is not necessary that the mold 94 be heated.

The overmolding material 92, which has been heated and liquefied is then injected into the mold 94. The mold 94 is constructed so that it directs the liquefied overmolding material 92 through the mold to the contacting portions of the padup 42 and the plurality of strips 22 on the interior surface 24 of the skin panel 18 and to intersections or interfaces between the plurality of strips 22. Again, depending on the types of the thermoplastic composite materials used to construct the aircraft structure of FIG. 2, the heat of the liquefied overmolding material 92 could cause contacting portions of the padup 42 and the plurality of strips 22 with the interior surface 24 of the skin panel 18 to partially melt and fuse together. The liquefied overmolding material 92 is directed by the mold 94 to its position relative to the padup 42, the plurality of stiffener strips 22 and the interior surface 24 of the skin panel 18 represented in FIG. 2. The liquified overmolding material 92 can also form the reinforcement around the opening 38 through the skin panel 18 and form stiffening elements of the interior surface 24 of the skin panel 18 and/or the plurality of stiffener strips 22. The overmolding material 92 injected into the mold 94 is then allowed to cool, forming joints between the contacting portions of the padup 42 and the plurality of stiffener strips 22 with the interior surface 24 of the skin panel 18, securing the padup 42 and the plurality of stiffener strips 22 to the interior surface 24 of the skin panel 18.

The mold is then opened, and the aircraft structure comprised of the skin panel 18, the padup 42 and the plurality of stiffener strips 22 is removed from the mold.

According to the above-described method, the aircraft fuselage structure represented in FIG. 2 is constructed comprised of the skin panel 18, the padup 42 on the interior surface 24 of the skin panel 18, the plurality of intersecting stiffener strips secured to the interior surface 24 of the skin panel 18, and the overmolding material 92 securing the padup 42 and the plurality of stiffener strips 22 to the interior surface 24 of the skin panel 18 and to each other.

Although the overmolded structure is described herein as an aircraft structure, the overmolded structure could also apply to a space launch vehicle structure, a bulkhead structure, or other such structural applications.

As various modifications could be made in the aircraft structure and its method of construction herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An aircraft structure comprising:
    a panel, the panel having an exterior surface and an interior surface on opposite sides of the panel;
    a plurality of strips on the interior surface of the panel; and,
    wherein the plurality of strips include a first strip defining a slot, and the plurality of strips include a second strip defining a slot;
    wherein the first strip extends into the slot of the second strip and the second strip extends into the slot of the first strip such that the first strip and the second strip intersect each other at the slot of the first strip and the slot of the second strip to present an interface location;
    an overmolding material extending between the plurality of strips, wherein the overmolding material secures the plurality of strips together.

2. The aircraft structure of claim 1, wherein:
    the overmolding material extends between the interior surface of the panel and the plurality of strips, wherein the overmolding material secures the plurality of strips to the interior surface of the panel.

3. The aircraft structure of claim 2, wherein:
    the plurality of strips have edges, wherein the edges of the plurality of strips are secured by the overmolding material to the interior surface of the panel.

4. The aircraft structure of claim 2, wherein:
    the plurality of strips have lengths that extend across the interior surface of the panel; and,
    the plurality of strips have widths that extend outward from the interior surface of the panel.

5. The aircraft structure of claim 4, wherein:
    some strips of the plurality of strips have different width dimensions.

6. The aircraft structure of claim 2, wherein:
    some strips of the plurality of strips have different thickness dimensions.

7. The aircraft structure of claim 2, wherein:
    the overmolding material secures the first strip having a slot and the second strip to the interior surface of the panel and secures the first strip and the second strip to each other at the interface location.

8. The aircraft structure of claim 2, wherein:
    the plurality of strips are flat laminate strips of composite materials.

9. The aircraft structure of claim 2, wherein:
    the overmolding material is a fiber reinforced thermoplastic.

10. The aircraft structure of claim 1, further comprising:
    a padup strip abutting the interior surface of the panel and configured to reinforce an area of the panel, wherein at least one of the plurality of strips cross the padup strip and the overmolding material secures the at least one of the plurality of strips to the padup strip.

11. An aircraft structure comprising:
    a skin panel having an exterior surface and an interior surface opposite the exterior surface;
    a plurality of strips on the interior surface of the skin panel, wherein the plurality of strips have edges that are connected to the interior surface of the skin panel; and,
    wherein the plurality of strips include a first strip defining a slot, and the plurality of strips include a second strip defining a slot;
    wherein the first strip extends into the slot of the second strip and the second strip extends into the slot of the first strip such that the first strip and the second strip intersect each other;
    an overmolding material on the interior surface of the skin panel, wherein the overmolding material extends between the interior surface of the skin panel and the plurality of strips, and the overmolding material secures the plurality of strips to the interior surface of the skin panel.

12. The aircraft structure of claim 11, wherein:
    the plurality of strips have length dimensions that extend across the interior surface of the skin panel; and,
    the plurality of strips have width dimensions that extend outwardly from the interior surface of the skin panel.

13. The aircraft structure of claim 11, wherein:
    some strips of the plurality of strips have different width dimensions; and,
    some strips of the plurality of strips have different thickness dimensions.

14. The aircraft structure of claim 11, wherein:
    the overmolding material extends over the first strip and the second strip at the slot of the first strip to secure the first strip and the second strip to each other at an interface location.

15. The aircraft structure of claim 11, wherein:
    each strip of the plurality of strips is a flat laminate of composite material.

16. The aircraft structure of claim 11, wherein:
    the overmolding material is a thermoplastic.

17. The aircraft structure of claim 11, further comprising:
    a padup strip abutting the interior surface of the skin panel and configured to reinforce an area of the skin panel, wherein at least one of the plurality of strips cross the padup strip and the overmolding material secures the at least one of the plurality of strips to the padup strip.

18. A method of constructing an aircraft structure, the method comprising:
    positioning a panel having an exterior surface and an interior surface opposite the exterior surface in a mold with the exterior surface of the panel contacting the mold;
    positioning a plurality of strips on the interior surface of the panel with the plurality of strips arranged in an intersecting grid pattern, wherein the plurality of strips include a first strip defining a slot, and the plurality of strips include a second strip defining a slot, wherein the first strip extends into the slot of the second strip and the second strip extends into the slot of the first strip such that the first strip and the second strip intersect each other in the grid pattern;
    closing the mold; and,
    injecting an overmolding material into the mold and overmolding the interior surface of the panel and the plurality of strips with the overmolding material such that the overmolding material secures the plurality of strips together.

19. The method of claim 18, further comprising:
    securing the plurality of strips on the interior surface of the panel with the overmolding material injected into the mold.

* * * * *

UNITED STATES PATENT AND TRADEMARK OFFICE
CERTIFICATE OF CORRECTION

PATENT NO. : 11,485,468 B2
APPLICATION NO. : 16/144665
DATED : November 1, 2022
INVENTOR(S) : Adriana Willempje Blom-Schieber Page 1 of 1

It is certified that error appears in the above-identified patent and that said Letters Patent is hereby corrected as shown below:

In the Claims

Claim 7, Column 7, Lines 45-46: "strip having a slot and" should read --strip and--

Signed and Sealed this
Second Day of April, 2024

Katherine Kelly Vidal
*Director of the United States Patent and Trademark Office*